J. TAVELLI.
AUTOMOBILE BODY.
APPLICATION FILED FEB. 23, 1921.

1,410,139.

Patented Mar. 21, 1922.

INVENTOR
JOHN TAVELLI
By Edward B. Birkenbeul
ATTORNEY.

UNITED STATES PATENT OFFICE.

JOHN TAVELLI, OF PORTLAND, OREGON.

AUTOMOBILE BODY.

1,410,139. Specification of Letters Patent. Patented Mar. 21, 1922.

Application filed February 23, 1921. Serial No. 447,044.

*To all whom it may concern:*

Be it hereby known that I, JOHN TAVELLI, a citizen of the United States, and resident of Portland, in the county of Multnomah and State of Oregon, have invented a new and useful Automobile Body, of which the following is a specification.

This invention relates more particularly to that class of automobiles known as "bugs", which are ordinarily designed to carry only two people.

The object of my invention is to render it possible to very easily convert this type of vehicle into one having a four seat capacity by the utilization of what is now waste space.

Figure 1:
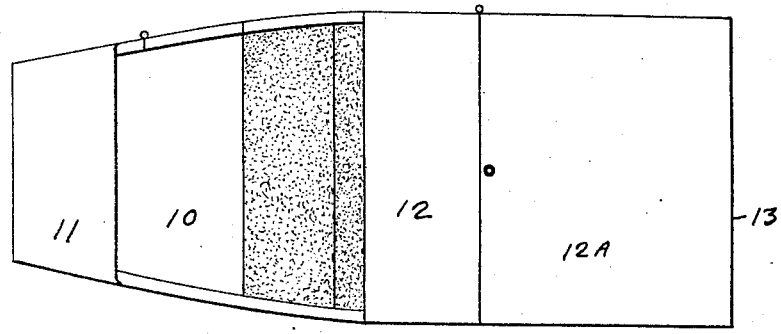
Figure 2:
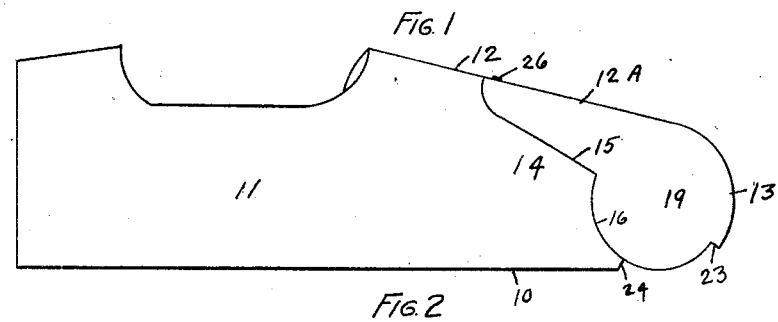
Figures 3, 6:
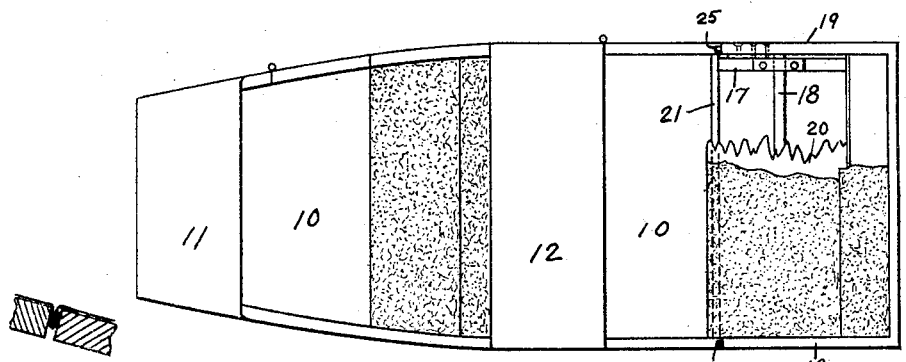
Figure 4:
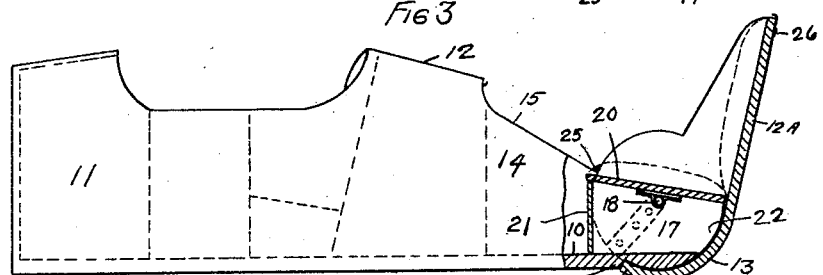
Figure 5:
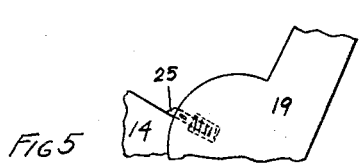

I accomplish this result in the manner set forth in the following specification and illustrated in the accompanying drawing, in which:

Figure 1 is a plan of my device when being used as a "bug". Figure 2 is a side elevation of Figure 1. Figure 3 is a plan of the device in the four seat form with parts broken away for clearness. Figure 4 is a side elevation of Figure 3 with parts cut away in section. Figure 5 is a detailed view showing the latch for holding the rear seat back open. Figure 6 is a detail showing the manner in which I secure a weather-proof joint along the lines of contact of the upper edge of the seat back and the body.

I have illustrated herein only the body of an automobile as it is only this which enters into my invention.

Similar numbers of reference refer to the same or similar parts throughout the several views.

Referring in detail to the drawing, I have constructed on the floor 10 the usual form of "bug" body 11 having a somewhat square rear end. The deck 12 of this body slopes away to the rear and terminates in a curved portion 13. The sides 14 of the body 11 are separated along the line 15 and the arc 16 which is struck from the same center as is the curved portion 13. On the floor 10 are mounted the two standards 17 which carry a transverse shaft 18, on whose outer ends are secured the side portions 19 of the seat back 12$^A$. A seat 20 rests upon the standards 17 and has under its forward end a partition 21 which forms a box-like compartment underneath the seat 20. A curved piece of metal 22 is also fastened to the standards 17 just inside of the curved portion 13 of the seat back 12$^A$. The end 23 of the curved portion 13 engages a notch 24 on the under side of the floor 10 and serves to limit the backward movement of the seat back 12$^A$. Spring-urged latches 25 engage the side walls 14 and prevent the seat back 12$^A$ from moving forward unless desired.

I have also provided a lock 26 in order to insure the seat back 12$^A$ being kept in a closed position when not in use.

I have illustrated a weather-proof joint at the union between the deck 12 and the seat back 12$^A$, which may be varied in form without departing from the spirit of my invention.

The operation of my device is exceedingly simple. When desiring to convert a "bug" so equipped into a four passenger car it is only necessary to turn a key in the lock 26 and raise the back 12$^A$ to the position shown in Figure 4. The latches 25, which are spring-urged, immediately lock the seat back in its position. The reverse movement is equally as simple, it being only necessary to push the latches 25 back into their sockets and swing the seat back 12$^A$ forwardly and lock into place.

It is evident that any number of forms and shapes and door combinations may be combined with this invention without departing from its spirit.

What I claim as new is:—

1. In an automobile body, the combination of a body floor, standards mounted on said floor, a rear seat resting on said standards, and a rear seat back hinged on the outer sides of said standards in a manner to permit same to fold downwardly and forwardly to form a complete cover over said rear seat.

2. In an automobile body, the combination of a body floor, a pair of standards rising from the rear end of said floor, a rear seat resting on said standards, a seat back hinged to the outside of said standards, said seat back having sides whose lower ends are in the form of a three quarter circle and whose upper portions consist of angular pieces, one side of which forms a tangent to said part circle and the other side intersects the part circle in the direction of its center which is also the location of the above-mentioned hinge, and an automobile body having its rear portion cut away to match the outline of said seat sides when folded down.

3. In an automobile body, the combination of a body floor, rear seat supporting standards mounted on said floor, a shaft passing through said standards, a seat above said shaft, a seat back hinged on said shaft outside of said standards, and means for locking said seat back in either its rearward or forward position.

JOHN TAVELLI.